United States Patent [19]

Nakamura et al.

[11] 4,409,597
[45] Oct. 11, 1983

[54] LINE PRINTER FOR RECORDING ANALOG SIGNALS

[75] Inventors: Kenji Nakamura, Takatsuki; Shigeru Ideno, Kameoka, both of Japan

[73] Assignee: Shimadzu Corporation, Kyoto, Japan

[21] Appl. No.: 363,626

[22] Filed: Mar. 30, 1982

[30] Foreign Application Priority Data

Jul. 30, 1981 [JP] Japan ............................ 56-120393

[51] Int. Cl.³ ........................ G01D 9/12; G01D 15/10
[52] U.S. Cl. .................................. 346/35; 346/76 PH
[58] Field of Search ............ 346/34, 35, 76 PH, 76 R; 219/216 PH

[56] References Cited

U.S. PATENT DOCUMENTS

| | | | |
|---|---|---|---|
| 3,174,427 | 3/1965 | Taylor | 346/35 X |
| 4,145,697 | 3/1979 | Ballinger | 346/35 |
| 4,145,756 | 3/1979 | Cochran et al. | 219/216 PH X |
| 4,216,478 | 8/1980 | Giedd et al. | 346/76 PH X |
| 4,224,869 | 9/1980 | Morin | 346/76 PH X |
| 4,335,968 | 6/1982 | Regnault | 346/76 PH X |
| 4,360,819 | 11/1982 | Saito et al. | 346/76 PH |

Primary Examiner—Donald A. Griffin
Attorney, Agent, or Firm—Koda and Androlia

[57] ABSTRACT

A line printer adapted for use recording analog signals, includes a plurality of printing elements arranged side by side in a row, wherein they are located close to each other one after another, an output head carrying the printing elements such that they are individually and selectively driven, a paper feeding device allowing a paper to be fed perpendicularly to the row of the printing elements, a pair of registers for storing the maximum data and the minimum data received for a give period of time, and means for driving the output head so as to cause the printing elements to be driven at the same time correspondingly to the maximum data, the minimum data and data interlocated therebetween.

3 Claims, 6 Drawing Figures

LINE PRINTER FOR RECORDING ANALOG SIGNALS

BACKGROUND OF THE INVENTION

The present invention relates to a line printer adapted for use in recording analog signals having continuously varying levels. More particularly, the present invention relates to a line printer adapted for use in recording analog signals varying with respect to time, wherein the record is represented by a continuous line pattern. The line printer includes an impact type and a non-impact type.

A line printer or a dot printer is known and widely used. The line printer includes a plurality of printing elements, commonly called styluses, which are located in parallel on a line. The styluses are driven in response to inputs so as to record same on a paper in a line pattern. However, as is well known, analog signals continuously vary with respect to time, and to record same exactly, a recording equipment must have an extremely high responsiveness to the input signals. The known printers, however, have been found unsuitable for meeting this requirement, and the resulting marks lack a continuity with dots being left out in places. This leads to an inaccurate recording of the data.

OBJECTS AND SUMMARY OF THE INVENTION

The present invention aims at solving the problems pointed out with respect to the known line printers, and has for its object to provide an improved line printer capable of recording continuously varying analog signals in a continuous line pattern.

Another object of the present invention is to provide an improved line printer capable of quickly responding to any signals continuously varying with respect to time.

According to one advantageous aspect of the present invention a line printer includes a plurality of printing elements arranged side by side in a row, wherein they are located close to each other one after another, an output head carrying the printing elements such that they are individually and selectively driven, a paper feeding device allowing a paper to be fed perpendicularly to the direction in which the printing elements are arranged, a pair of registers for storing the maximum data and the minimum data of all signals received for a given period of time, and means for driving the output head so as to cause the printing elements to be driven at the same time correspondingly to the maximum data, the minimum data and the data interposed therebetween.

A BRIEF EXPLANATION OF THE DRAWINGS

Figure 2:
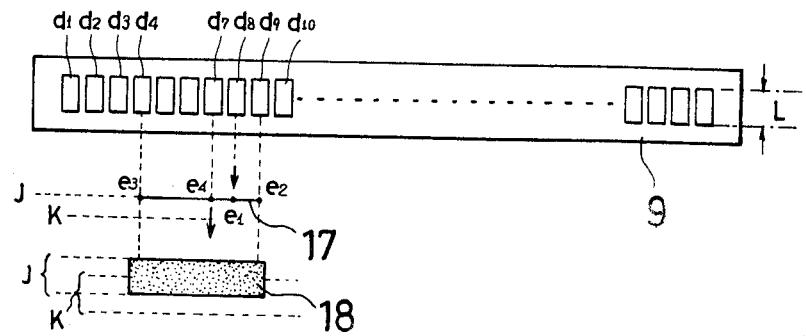
FIG. 2 is a schematic view explaining the operation of an output head included in a line printer according to the present invention.
Figure 4:
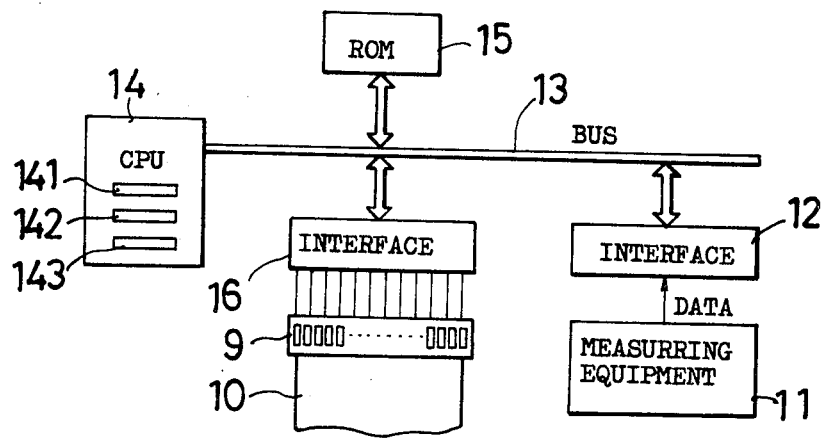

FIG. 2 (A) and (B) are examples of the printed marks on an enlarged scale;

FIG. 4 is a block diagram in alternative embodiment; and

Figure 5:
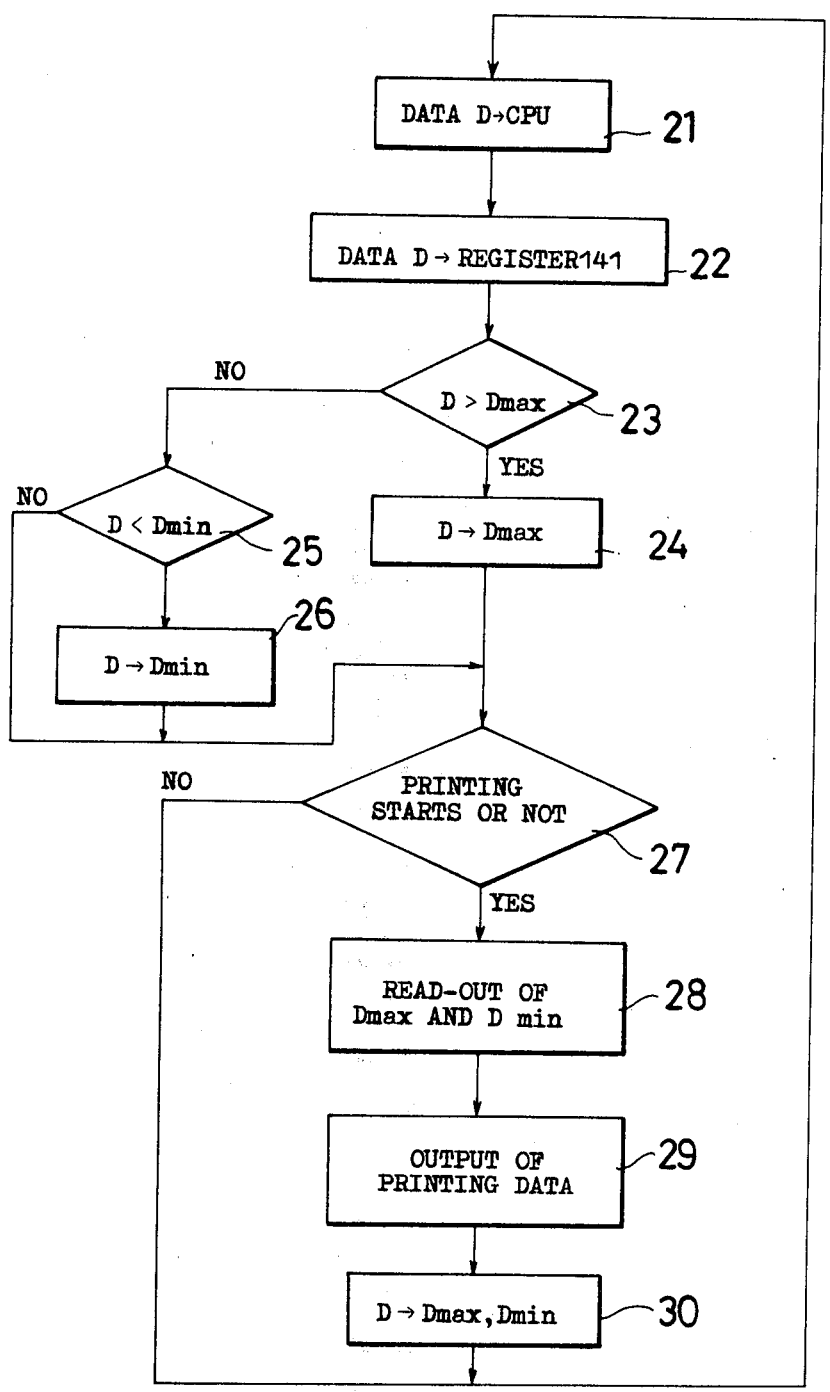

FIG. 5 is a flowchart showing a program stored in the ROM in FIG. 4.

DETAILED DESCRIPTION OF THE INVENTION

Referring to FIG. 2, an outut head 9 carries a plurality of printing elements $d_1, d_2, d_3 \ldots d_n$ which are arranged side by side in a row, wherein the printing elements are located close to each other one after another. In one example, 6 pieces were arranged within 1 mm, wherein each printing element was 0.6 mm long in the direction in which the paper was fed. The output head 9 is a commonly-called thermal printer, which includes an electric heater. The printing elements $d_n$ are totally or partially driven at the same time through the energization of a driver circuit, and produce visual marks on the paper 10 which has a heat sentive nature. The paper 10 is intermittently fed by a given distance, and when it is at rest, the printing elements are kept in contact with the paper 10. The amount of one feed of the paper will not exceed the length of the printing elements. As a result, when only one printing element, for example, $d_j$, is driven, the resulting mark can be nevertheless a continuous line pattern.

Figure 1:
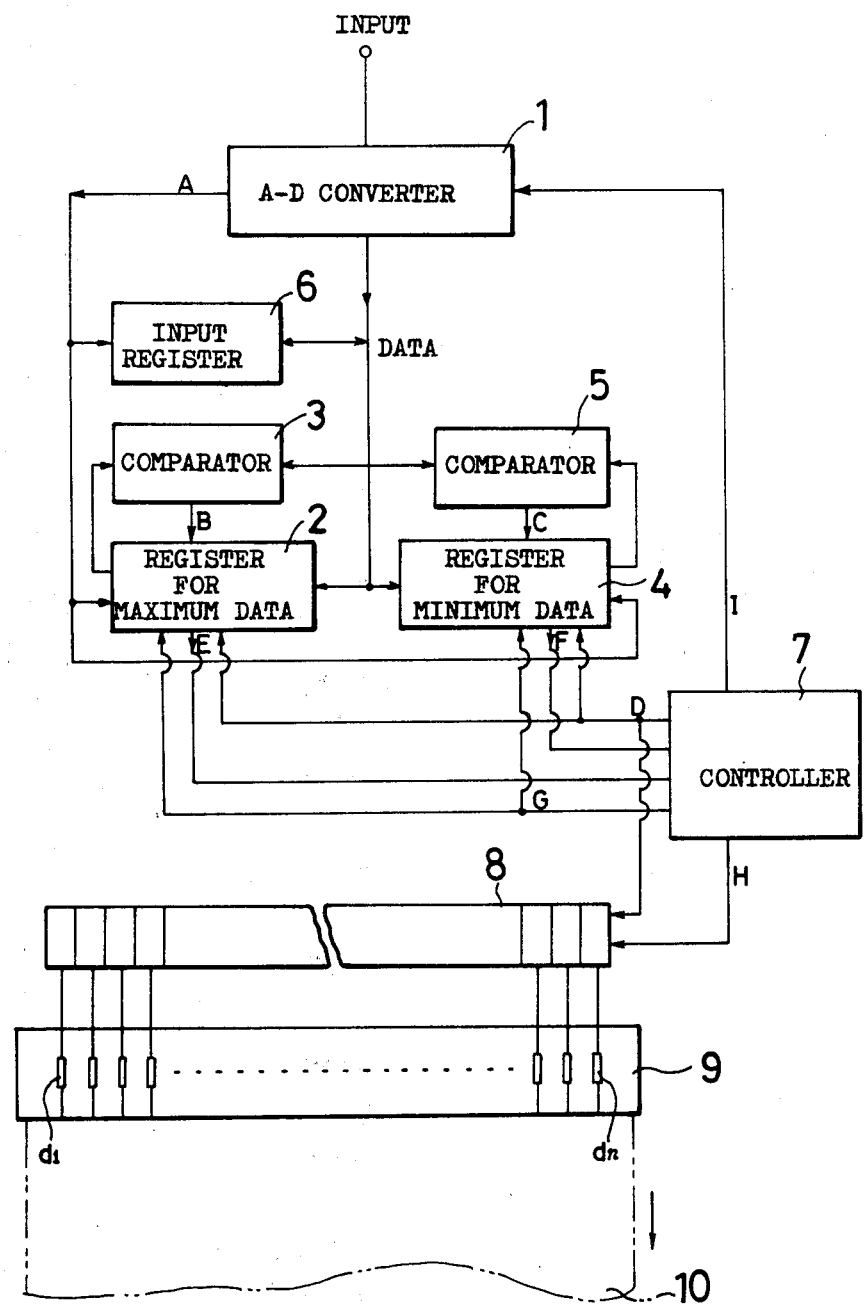
FIG. 1 is an electric block diagram.

Referring to FIG. 1 an analog-to-digital converter 1 (A/D converter) receives signals to be recorded from an input terminal INPUT, and convert same into digital signals in bit-corded form so as to transmit same as data. In addition, the A/D converter 1 receives signals I for initiating the conversion, and outputs signal A for terminating the conversion.

A register for storing the maximum data 2 is intended to store the maximum numbered data of all the signals received for recording. This register 2 is connected to a comparator 3 such that the output therefrom can be applied to an input of the comparator 3. Initially, the register 2 stores the first data from the A/D converter 1, and the comparator 3 receives data from the A/D converter 1 at another input terminal. In this way the comparator 3 initiates a comparison of the received data with the content stored in the register 2. If the data therein is found larger than the content in the register 2, an output B is applied to the register 2.

Likewise, a register for the minimum data 4 is intended to store the minimum numbered data of all the signals received for recording. This register 4 is connected to a further comparator 5 such that the outputs therefrom can be applied to an input of the comparator 5. The comparator 5 receives data from the A/D converter 1 at another input terminal, and initiates a comparison of the received data with the content stored in the register 4. If the data therein is found smaller than the content stored in the register 4, an output C is applied to the register 4.

There is a third register 6, referred to as an input register, which is intended to receive data from the A/D converter 1 at its input terminal, and store from data to data for each point of time. When the A/D converter 1 is at rest, this input register 6 can transmit data stored therein on its own.

The storing and renewing of data in each register 2, 4 and 6 are effected synchronously with the receipt of the conversion terminating signal A from the A/D converter 1 applied thereto.

The registers 2 and 4 function as down-counters; that is, when they receive a clock signal D from a timing controlling circuit 7, hereinafter referred to as a controller, they reduce the counts accumulated therein. When the count is reduced to zero, the registers 2 and 4 generate signals E and F, respectively, to the controller 7. In addition, the registers 2 and 4 are used to renew the entries in the input register 6 in response to the signals transmitted from the controller 7.

A shift register 8 is intended to drive the output head 9, and is constructed in an n-bit system for serial input and parallel output, wherein each bit corresponds to each printing element $d_n$ in the output head 9. When one of the printing elements is to be driven, the number "1" is stored at the corresponding bit position, and when the same is kept inoperative, the "0" is stored at the same position. The signal "1" or "0" is applied to the shift register 8 as signal H from the controller 7, and the shift register 8 is shifted synchronously with the receipt of the clock signal D from the controller 7.

As described above, the controller 7 is intended to generate the conversion initiating signal I, the clock signal D, and to shift the signal H from "0" to "1" or from "1" to "0". It also generates signal G. In this way the controller 7 controls the timing in the system as shown in FIG. 2.

Referring to FIG. 2 a typical example of the operation will be explained:

For explanatory purpose, let it be that data $e_1$, $e_2$, $e_3$ and $e_4$ are successively applied to the INPUT at the time of $t_1$, $t_2$, $t_3$ and $t_4$. The output levels of these data in the A/D converter 1 are respectively $n_8$, $n_9$, $n_4$ and $n_7$. These correspond to the printing elements $d_8$, $d_9$, $d_4$ and $d_7$, respectively. The reference numeral 17 designates an imaginary line passing through the centers of printed marks 18 on the paper 10.

The conversion initiating signal I is applied to the A/D converter 1 from the controller 7, and in response to it the A/D converter 1 converts $e_1$ corresponding to the level $d_8$ into digital signal, which is output as data $e_1$. When the conversion terminating signal A is generated, and in response thereto the data $e_1$ is stored in the register for the maximum data 2, the register for the minimum data 4 and the input register 6. At the next sampling stage, the second conversion initiating signal I is applied to the A/D converter 1, the level of the input signal $e_2$ has changed into the level $d_9$ at that time. In this way when the A/D converter 1 outputs the data $e_2$, the comparator 3 initiates a comparison of the new data $e_2$ with the $e_1$ previously stored in the register for the maximum data 2. Since the data $e_2$ ought to be larger than the data $e_1$, the former is added to the register 2 by generating signal B. The comparator 5 initiates a comparison of the data $e_2$ with the data $e_1$ previously stored in the register for the minimum data 4, but since $e_1$ ought to be smaller, the signal C will not be generated. Accordingly, with the addition of the conversion terminating signal A the data $e_2$ is renewedly stored in the register 2 and the input register 6, while the data $e_1$ remains in the register 4 as the minimum data.

At the next sampling stage the signal to be recorded drastically moves, and the A/D converter 1 outputs data $e_3$ corresponding to the level $d_4$. The comparator 3 compares the data $e_3$ with the data $e_2$ stored in the register 2 in the aforementioned manner. Likewise, the comparator 5 compares $e_3$ with $e_1$ remaining in the register 4 in the afore-mentioned manner. In both cases the data $e_3$ will be smaller, and in response to it the comparator 5 generates signal C while the comparator 3 generates no signal. With the addition of the conversion terminating signal A, the number of the level $d_4$ for the content of the $e_3$ is renewedly stored in the register for the minimum data 4 and the input register 6. On the other hand, the level $d_9$ for the content of $e_2$ remains in the register for the maximum data 2.

At the further advance of the sampling stage, the A/D converter 1 outputs $e_4$ correspondly to the level $d_7$. Likewise, the comparator 3 compares $e_4$ with the data $e_2$ stored in the register 2, and the comparator 5 compares $e_4$ with the data $e_3$ stored in the register 4 in the fore-mentioned manner. The data $e_2$ stored in the register 2 is larger than $e_4$, but $e_4$ is larger than the data $e_3$ stored in the register 4. At this stage, with the addition of the convertion terminating signal A the data $e_4$ is renewedly stored in the input register 6 while the same data remains in the registers 2 and 4.

In this way the entries of data for each register 2, 4 or 6 is finished for the Step J. Finally, the data is printed on the paper by driving the output head 9.

Figure 3:
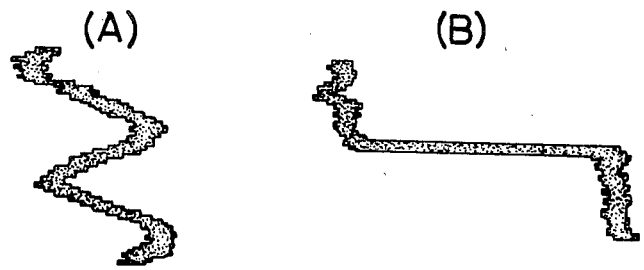

The stored content $e_2$ in the register 2 corresponds to the level $d_9$, and the stored content $e_3$ in the register 4 corresponds to the level $d_4$. Therefore, if all the printing elements $d_5$, $d_6$, $d_7$, and $d_8$ between the printing elments $d_4$ and $d_9$ are driven, a continuous line pattern of mark will be achieved, the samples of which are shown in FIG. 3. This will be explained in greater detail:

As described above, the controller 7 generates a clock signal D, and does "0" for signal H. When four clock signals are applied, the content stored in the register 4 is counted down to zero, and signal F is generated. In response to the signal F the controller 7 shifts the signal H from "0" to "1". Accordingly, the shift register 8 stores "0" for the initial three bits, and "1" for the fourth bit and onward. When all the nine clock signals D are applied, the content stored in the register 2 is counted down to zero, and signal E is generated. In response to the signal E the controller 7 shifts the signal H from "1" to "0". The clock signals D are generated by the same number as that of the bits for the shift register 8. As a result, "0" is stored in the shift register 8 for the 10th bit and onward. In this way the output head 9 is driven to cause the printing elements $d_4$, $d_5$, $d_6$, $d_7$, $d_8$ and $d_9$ in accordance with the contents stored in the shift register 8. This secures a continuous line pattern of mark on the paper.

When the bit data has been stored in the shift register 8, the controller 7 generates the signal G. To use it in the subsequent operation at the Step K, the data stored in the input register 6 is transferred to both the registers 2 and 4. The same sequence of operations take place one after another in the afore-mentioned manner.

In the embodiment described above, "1" is stored in the shift register 8 for the fourth bit and onward (up to [n−3]), so as to secure a continuous line pattern of mark, but it is also possible to secure a continuous dot pattern or a continuous dot-and-line pattern by repeating "0" and "1" alternately in the same bit range.

In addition, in the embodiment the range of a sequence of bits is determined after the sampling data has been produced, but it is also possible to determine the range between the maximum data and the minimum data while collecting the data.

FIG. 3 shows two samples of the printed mark which have been obtained from the tests. FIG. (A) shows that the input signals minutely vary, and as a whole vary in a relatively large cycle. FIG. (B) shows that the input signals abruptly rise from a low level to a higher level. It will be appreciated from these figures that the printed marks are continuous throughout their lengths as if they were drawn by an ordinary plotting-pen recorder, and that all variations of the input signals are successfully recorded without any dots being left out, which would be impossible to attain under the conventional plotting-pen recorders. The facts or data are exactly recorded.

In the embodiment described above the component circuits are constructed in independent logical operation systems, but it is also possible to incorporate most of these systems into a microcomputer. This alternative embodiment will be described as follows:

Referring to FIG. 4 a measuring equipment 11 transmits its measured results to a CPU 14 through an interface for input 12 and a bus 13. The CPU 14 processes the transmitted data in accordance with the program written in a ROM 15, and outputs instructions on the basis thereof, which are transmitted to the output head 9 through the bus 13 and an interface for output 16. In this way the output head 9 is driven.

FIG. 5 shows a preferred example of the programs to be written in the ROM 15. At a step 12 the CPU 14 takes in data D which is transmitted through the interface for input 12 and the bus 13. At a step 22 the data D is stored in a memory within the CPU 14. At a decision step 23 the data D is compared with the maximum data stored in the CPU 14. If the data D is larger than the maximum data, the sequence advances to a step 24 where the maximum data is replaced by the data D. If the relationship $D > D_{max}$ is not affirmed, the sequence advances to the next decision step 25, where the same decision is repeated. If the data D is smaller than the minimum data, the latter is replaced by the former. If the relationship $D < D_{min}$ is not affirmed, no replacement occurs. So long as no instruction is received for initiating the printing, a step 27 remains "NO", and the sequence returns to the first step 21. In this way new data is taken in, and compared with the previously stored maximum data and minimum data. In this way the entries in the registers 2 and 4 are renewed.

If an instruction for initiating the printing is received for the step 27, the sequence advances to a step 28 where the maximum data and the minimum data are respectively read out, and at a step 29 the data to be printed is output to the interface for output 16 through the bus 13. In this way the output head 9 is driven. At a step 30 the last input data D is transferred to the register for the maximum data 2 and the register for the minimum data 4, where it is stored.

The detailed description and specific embodiments are given by way of illustration only, since various changes and modifications within the spirit and scope of the invention are of course possible.

What is claimed is:

1. A line printer for recording analog signals, which comprises:
    a plurality of printing elements arranged side by side in a row, said printing elements being located close to each other one after another;
    an output head carrying said printing elements such that they are individually and selectively driven;
    a paper feeding device allowing a paper to be fed perpendicularly to said row of said printing elements;
    a register for storing the maximum data of all signals received for a given period of time;
    a register for storing the minimum data of all signals received for said period of time, and
    means for driving said output head so as to cause said printing elements to be driven at the same time correspondingly to said maximum data, said minimum data, and data interlocated therebetween.

2. A line printer as set forth in claim 1, wherein said paper feeding device is adapted to feed said paper intermittently with rests such that when said paper is at rest said output head is driven by said driving means.

3. A line printer as set forth in claims 1 or 2, wherein said printing elements located between said printing elements corresponding to said maximum data and minimum data are driven at the same time, thereby printing a continuous line pattern of mark on said paper.

* * * * *